UNITED STATES PATENT OFFICE.

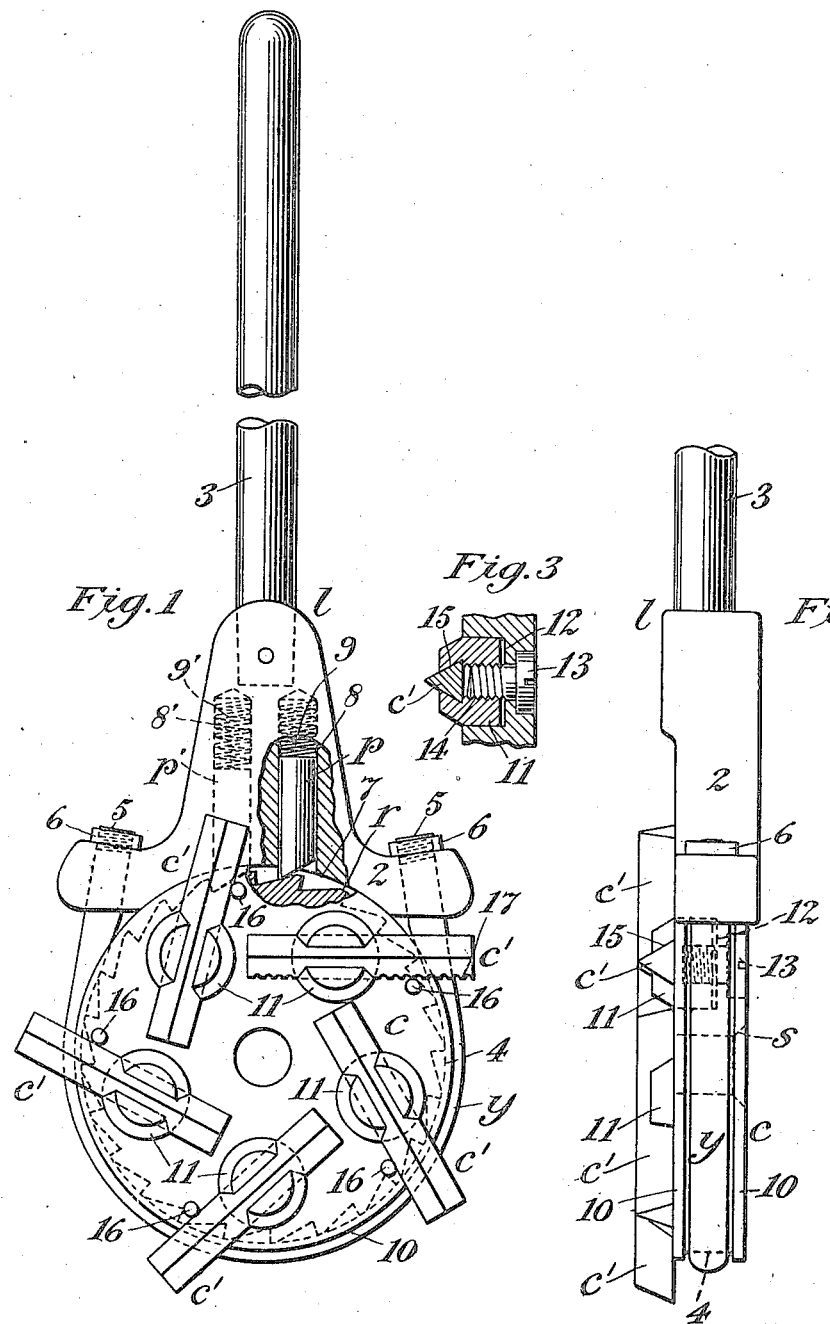

THOMAS B. WILLIAMS, OF ORANGE, MASSACHUSETTS, AND FRANK L. SMITH, OF CHICAGO, ILLINOIS, ASSIGNORS TO THE LEAVITT MACHINE COMPANY, OF ORANGE, MASSACHUSETTS, A CORPORATION OF MASSACHUSETTS.

ROTARY CUTTER.

1,227,514.  Specification of Letters Patent.  Patented May 22, 1917.

Application filed January 23, 1915. Serial No. 3,900.

*To all whom it may concern:*

Be it known that we, THOMAS B. WILLIAMS and FRANK L. SMITH, citizens of the United States, and residents, respectively, of Orange, in the county of Franklin and State of Massachusetts, and Chicago, in the county of Cook and State of Illinois, have invented certain new and useful Improvements in Rotary Cutters, of which the following is a specification.

This invention relates to a rotary cutter, and particularly to a cutter and its operating means suitable for use for dressing or recutting valve-seats, etc., that have become worn through use. In a more specific aspect thereof the cutter is especially designed and intended to provide an implement which while disposed as a whole in a general direction transverse to the cutting axis is operable for the cutting of a valve-seat or equivalent surface disposed in a position transverse to such cutting axis. Specifically the cutter and cutter-operating means disclosed herein is intended to constitute one of the two main elements of a valve-reseating tool or machine of the general type set forth in our companion application, Serial No. 3897, filed January 23, 1915, in which there is disclosed such a tool or machine made up of two main coöperative elements, one of which is a cutter and a suitable carrier and operating means therefor, and the other of which is a cutter-bar or support adapted to lie substantially parallel with the cutter and its parts and to coöperate therewith through a pivotal connection, preferably of the ball-and-socket type, for operation while the tool as a whole is located between two separated resistance points or surfaces, such, for example, as a pair of valve-seats.

The principal object of the present invention is to provide a suitable cutter and a cutter-carrier, etc., which will be adapted to recut a valve-seat or equivalent surface *in situ* and will occupy when in use a comparatively small space. In order to accomplish this result the cutter and its cutter-carrier, which is preferably a lever, will be so associated as to lie substantially in a common plane in which also will be located suitable means, such as a ratchet-feed device, for imparting movement to the rotary cutter.

Another important feature of the invention is the provision of a cutter with its carrier and suitable means for operating the cutter which will be so constructed as to have means at the axial center of the cutter for attachment to a part outside of the cutter and its cutter-carrier, etc. The preferred construction is one in which the cutter carries one element of a pivotal or ball-and-socket connection adapted to be separably associated with another element, such, for example, as the other main element of the valve-facing tool shown in our aforesaid companion application, for the purpose of permitting it and the other main element of such a tool to be brought into operative relation with each other and with a valve-seat or other surface to be faced, and to do its work while disposed in a general direction transverse to the cutting axis.

Another important feature of the invention is the provision of a rotary cutter having a circuit of individual cutters disposed in different angular positions with respect to the cutting axis, the disposition of these cutters or cutting edges being preferably such that each edge will take its chip at a different angle from that of the cutter next preceding it. As to this feature of the invention, it is an improvement upon the multiple-edge cutters disclosed in our prior Patents, No. 1028295, granted June 4, 1912, and No. 1012926, granted Dec. 26, 1911.

It has been found in practice that when valve-seats have been long in use and are covered with a coating of oxid or other refractory substance, a straight-edge cutter operates with difficulty during the initial stages of the refacing operation; and we have also found that this coating may be readily removed by employing a cutter during this initial stage of the refacing operation that has an interrupted or serrated edge. Another feature of our invention relates to the provision of a cutter having such cutting edge, and particularly to a cutter having a multiplicity of such edges disposed in a circuit about the cutting axis.

Other features of the invention not hereinbefore referred to will be hereinafter described and claimed and are illustrated in the accompanying drawings, in which, Figure 1 is a sectional side elevation (partly broken) of a cutter and cutter-carrier constructed in accordance with the present invention, the view being taken looking toward the face of the cutter;

Fig. 2 is an edge view of the same with the end of the lever partly broken away, and Fig. 3 is a detail of one of the holding devices for the individual cutters, this view being mainly in section.

Similar characters designate like parts in all the figures of the drawings.

In carrying the present invention into effect we may make use of any suitable cutter, cutter-carrier, and operating connections between them that will be capable of proper coöperation with a surface to be faced, provided that these parts lie substantially in a common plane or are adapted for attachment at the axial center of the device to a part lying outside of it with which the cutter is to coöperate. The preferred construction, however, is one in which a rotary cutter and a cutter-carrier, usually in the form of a lever, are associated in such a manner, usually separably, as to lie in a common plane, and in which the rotary movement of the cutter is derived from an oscillating movement of such carrier or lever about the axis of the cutter through a ratchet-feed connection. The cutter will usually be made up of a cutter-head and individual cutters carried thereby. The cutter-head is designated generally by $c$, and is preferably a single relatively thin disk lying substantially in the central flatwise plane of a suitable carrier or lever, such as 1. This lever may in turn be of any construction suitable for the purpose, it being here illustrated as having a substantially T-shaped head such as 2, and a plain bar or rod, 3, permanently secured to it. The connection between this lever and the cutter-head is in the present case one that permits the cutter-head to be supported wholly peripherally by the lever, and in the construction illustrated the cutter-head has a peripheral journal surface, such as 4, adapted to coöperate with a corresponding bearing face on the lever 1. In the construction shown this bearing surface is the inner face of a yoke, such as $y$, the ends of which are threaded, at 5, and pass through bored openings near the ends of the cross-piece of the T-head 2 of the lever, said yoke being held in place in any suitable manner, as for example by means of the adjusting nuts, 6. By means of these nuts the disk cutter-head $c$ may be brought into proper operative relation with the T-head 2 of the lever.

It will be seen that the peripheral support furnished by the yoke $y$ extends about two-thirds of the way around the periphery of the cutter-head. The major portion of the remainder of the periphery of the cutter-head is intended to fit closely up against the curved inner end surface, 7, of the T-head 2 this curve being struck from a radius of substantially the same length as that of the periphery of the cutter-head itself.

Any suitable feed connection may be employed for turning the cutter-head and its cutters about the axis thereof. The construction shown is a rotary ratchet-feed cutter in which the cutter-head has a circuit of ratchet-teeth, such as $r$, coöperative with a feed-pawl or pawls, such as $p$ and $p'$, which are here mounted in suitable bores, 8 and 8', in the T-head of the lever. These pawls in the present case are simple pins with suitable oblique faces where they coöperate with the ratchet-teeth $r$, and they are held up to their work by coiled springs, such as 9 and 9', in the bores 8 and 8' between the back wall of each bore and the inner end of the corresponding pawl. Of course the ratchet-teeth $r$ may be formed on the cutter-head in any suitable manner. Here they are shown as produced by suitably milling out the proper portions of the periphery of the disk $c$ so as to leave an interrupted peripheral surface intersected by the angular faces of the teeth themselves. This peripheral surface constitutes in the construction shown a peripheral journal surface that is in contact with the inner or bearing surface of the yoke $y$. Thus the circuit of ratchet-teeth and the journal surface of the cutter-head are both disposed in the comomn central flatwise plane of the cutter-head and lever; and the outer faces of the teeth form portions of the journal surface. The cutter-head may be located laterally so that it will not be improperly placed or come loose from the yoke by providing stop-flanges, such as 10—10, at opposite sides of the cutter-head. The manner in which they coöperate with the yoke and the surfaces of the ratchet-teeth to locate the cutter-head and the cutters positively both lengthwise and crosswise of the tool will be obvious.

As before stated, an important feature of the invention is the provision of a cutting implement of this general class, that is, one having a general direction transverse to its cutting axis, which may be readily but detachably brought into operative relation with the work itself. In our aforesaid companion application this is done by associating the cutter and cutter-carrying lever with a cutter-bar on which the cutter is pivoted, as by means of a universal connection. In the present case suitable means for permitting the tool to be mounted and operated in this manner is one of the main features of the device. The construction shown is one in which the means provided at the axial center of the cutter for supporting it on such a cutter-bar is a socket, such as $s$, constituting one element of a ball-and-socket connection such as disclosed in our aforesaid application. This socket is here shown as at the end of a bore passing entirely through the disk-cutter c.

The ball-and-socket connection just described is intended to be made at one face of the cutter-head c. The cutters mounted on said cutter-head are preferably located at the other face thereof. Here there are five cutters, each preferably triangular in cross-section and having, as in our aforesaid patents, edges that preferably operate with a scraping rather than a cutting action and are so located that when in place they will lie in a common plane, that is to say, each set of cutting edges will lie in such plane. It will be seen that as each of the five cutters proper shown herein has three cutting edges it is possible to bring three different sets of cutting edges at different times into such common plane. These cutters are designated generally by c'.

These cutters proper may be secured to the cutter-head and held in place thereon in any suitable manner but preferably by devices substantially such as are shown. Here each individual cutter is supported in a corresponding substantially triangular opening in a stud, such as 11, adapted to be seated in a countersunk opening the large diameter of which is at that side of the cutter-head opposite the socket s, and which at the side of the cutter in which said socket s is located has a countersunk opening of smaller diameter for the reception of the head of a clamp-screw, such as 13, which passes into a correspondingly threaded opening, 14, in the stud or post 11. The threaded opening 14 intersects the triangular opening or guide-way in which each individual cutter c' is mounted and in which said cutter is preferably adjustable longitudinally, as in the second of our aforesaid patents. By simply inserting the stud or post 11 in place and then the cutter and locating the cutter lengthwise in the guide-way, 15, in said stud and then inserting the screw 13 from the opposite side of the cutter-head and screwing it home until the screw, the cutter c' and the disk c are all clamped tightly together, the cutter will be properly positioned to do its work. Each of the individual cutters c' is inserted and clamped in position in this manner and each is individually adjustable lengthwise in its stud. Each may also be adjustable to different positions about the axis of its stud and held in any angular position to which it may be shifted by means of a suitably positioned pin, such as 16. The construction illustrated is one in which, as before stated, the cutters are intended to take their chips at different angles with respect to the work. The construction shown is one in which the cutters of the circuit are disposed at successively different angles so that no two successive cutters c' of the circuit will cut a valve-seat at the same angle. This is a matter of importance, particularly in operating upon relatively narrow annular valve-seats for which work the construction shown herein is particularly adapted.

As before stated, valve-seats that have been long in place and without refacing frequently become covered with a coating of scale, such as oxid, or other substance of greater hardness than the metal of the valve-seat itself, and it has been difficult heretofore to cut this coating in the initial stages of the refacing operation without seriously dulling the cutting edges. In order to overcome this we provide herein a cutter having an interrupted or serrated edge at one of the angles of the triangular individual cutter, this serrated edge being indicated at 17. When the valve-seat is badly coated with refractory material such as just referred to, the individual cutters c' will first be locked in place with their serrated edges 17 outward and the coating broken up and removed by a few turns of the tool, after which the cutters may be removed and replaced with their straight or continuous edges in position for cutting the bright metal exposed by the removal of such coating.

It will be seen from the foregoing that the improved cutter of the present application, while of general application for the cutting or facing of various kinds of surfaces, is particularly adapted for use between a pair of separated resistance surfaces, such as valve-seats, where the space in which the tool may be operated is limited; and also that such a cutter with its operating lever is especially useful as one of the main elements of a refacing tool of the type described in our aforesaid companion application, in which both of the main elements of the tool, to wit, a tool such as described herein and a complementary cutter-bar or support therefor, are insertible separately into a valve-casing and brought into operative relation with each other through a face-to-face ball-and-socket joint.

What we claim is:

1. A tool of the class described, comprising a rotary cutter-head having at its axial center an element of a universal connection for attaching it to a bearing outside the tool for rotation, a cutter-carrier extending from said cutter in the plane thereof, and a feed connection between said cutter-head and cutter-carrier, the maximum thickness of said tool being less than half the diameter of the cutter-head.

2. A tool of the class described, comprising a rotary cutter-head having at its axial center an element of a ball-and-socket joint for attaching it to a bearing outside the tool for rotation, a cutter-carrier extending from said cutter in the plane thereof, and a feed connection between said cutter-head and cutter-carrier, the maximum thickness of said tool being less than half the diameter of the cutter-head.

3. A tool of the class described, comprising a rotary disk cutter-head having a circuit of cutters at one side thereof, an element of a ball-and-socket joint at the axial center of the other side thereof for attaching it to a bearing outside the tool for rotation, and a circuit of ratchet-teeth between the sides of said cutter-head, a cutter-carrying lever, and a feed-pawl on said lever coöperative with said ratchet-teeth, the maximum thickness of said tool being less than half the diameter of the cutter-head.

4. A tool of the class described comprising a rotary cutter head, a carrier therefor having means for turning said cutter head, and a circuit of adjustable cutters at one face of said cutter head, said cutters having their cutting edges in a common plane and adapted to be adjusted to make various angles with each other.

5. In a tool of the class described, the combination with a rotary cutter-head having means for holding a cutter in place in any one of a plurality of positions, of a cutter having a plurality of cutting edges one of which is serrated and adapted to be turned and set with any one of its faces in working position.

6. In a tool of the class described, the combination with a rotary cutter-head, of a circuit of cutters opposite sides of each of which converge toward a cutting edge, and a circuit of clamping devices for said cutters each comprising a stud at one side of the cutter-head and having a slotted head forming a cutter-receiving guide-way corresponding approximately in cross-section to that of the cutter, and means at the other side of the cutter-head for engaging said stud and clamping the cutter in place therein.

7. In a tool of the class described, the combination with a rotary cutter-head, of a circuit of cutters opposite sides of each of which converge toward a cutting edge, and a circuit of clamping devices for said cutters each comprising a stud at one side of the cutter-head and having a slotted head forming a cutter-receiving guide-way corresponding approximately in cross-section to that of the cutter and means at the other side of the cutter-head for engaging said stud and clamping said stud and cutter to the adjacent surfaces of the cutter-head.

8. In a tool of the class described, the combination with a rotary cutter-head, of a circuit of cutters each triangular in cross-section, and a circuit of clamping devices for said cutters each comprising a stud at one side of the cutter-head and having in the head thereof a cutter-slot approximately triangular in cross-section and means at the other side of the cutter-head for engaging said stud and clamping said stud and cutter to the adjacent surfaces of the cutter-head.

9. A tool of the class described, comprising a rotary disk cutter head having cutting faces on one side, only, thereof and having an element of a bearing member on the opposite side, only, thereof, a cutter carrier having a bearing for supporting the cutter head at its periphery, and a feed connection between the cutter head and the cutter carrier.

10. A tool of the class described, comprising a rotary disk cutter head having cutting faces on one side thereof and an element of a compound bearing member on the opposite side, only, thereof.

11. A tool of the class described, comprising a rotary disk cutter head having cutting faces on one side, only, thereof and having an element of a bearing member on the other side, only, thereof, a cutter carrier having a bearing for supporting said cutter head for rotation substantially in the plane of the head, and a feed connection between said cutter head and said cutter carrier.

12. A tool of the class described, comprising a rotary disk cutter head having cutting faces on one side, only, thereof and an element of a bearing member arranged axially on the other side, only, thereof, and means for supporting the head for rotation.

13. A tool of the class described, comprising a rotary disk cutter head having cutting faces on one side, only, thereof and an element of a bearing member arranged axially on the other side, only, thereof, means for supporting the head for rotation, and means for imparting movement to the cutter head in one direction.

Signed by me, the said THOMAS B. WILLIAMS at Orange, in the county of Franklin and State of Massachusetts, this 23d day of December A. D. 1914.

THOMAS B. WILLIAMS.

Witnesses:
FRED A. DEXTER,
SIDNEY J. WHITE.

Signed by me, the said FRANK L. SMITH at Chicago, in the county of Cook and State of Illinois, this fourth day of January, A. D. 1915.

FRANK L. SMITH.

Witnesses:
GEO. H. ST. CLAIR,
N. W. HOPKINS.